Figure 1:
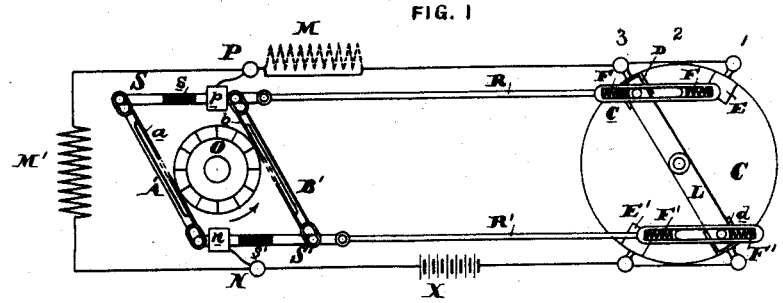

(No Model.)

A. RECKENZAUN.
BRUSH REVERSER FOR ELECTRIC MOTORS.

No. 432,561. Patented July 22, 1890.

Attest:
Henry Drury
E. M. Breckinred

Inventor:
Anthony Reckenzaun
by his atty

UNITED STATES PATENT OFFICE.

ANTHONY RECKENZAUN, OF LONDON, ENGLAND, ASSIGNOR TO THE ELECTRIC CAR COMPANY OF AMERICA, OF PHILADELPHIA, PENNSYLVANIA.

BRUSH-REVERSER FOR ELECTRIC MOTORS.

SPECIFICATION forming part of Letters Patent No. 432,561, dated July 22, 1890.

Application filed March 22, 1888. Serial No. 268,189. (No model.) Patented in England May 1, 1885, No. 5,376.

*To all whom it may concern:*

Be it known that I, ANTHONY RECKENZAUN, of London, England, have invented an Improvement in Electric Motors, of which the following is a specification.

My invention has reference to electric motors; and it consists in certain improvements, all of which are fully set forth in the following specification and shown in the accompanying drawings, which form part thereof.

This invention is in a great measure set out in English Patent No. 5,376, of May 1, 1885, granted to me.

The object of my present invention is to provide means whereby the direction of rotation of an electric motor or motors can be reversed, and at the same time to effect such reversal only at the moment when no current is passing through the armature or armatures of the propelling apparatus, and all as hereinafter described.

It has been well known ever since the introduction of electric motors that the armatures of such machines will rotate right-handed or left-handed, according to the position in which the brushes are placed relatively to the poles of the field-magnets forming part of a motor. If, however, the brushes of a motor are moved from the commutator while a current is flowing through the armature, two serious things will happen: First, an arc is formed between the receding brush and the nearest commutator-segments, thereby damaging the metal surfaces, and, secondly, the flow of the current from the generator being suddenly directed into the armature through different points, the currents induced by the sudden make and break have the tendency to destroy the insulation between the adjacent wires, and thus often permanently injure part or the whole of the motor-circuit. According to my present invention I obviate these objections in the following manner, viz:

I effect the reversal or the displacement of the brushes relatively to the commutator by means of parallel bars capable of sliding to and fro in or on fixed slides. Upon these bars I place the brushes, which will approach to or recede from the commutator, according to the movement of the bars, which are in plan at right angles to the axis of the armature. Now in order to prevent the possibility of an untimely reversal, which often occurs in a hurry during an excitement on board an electric boat, car, or other vehicle propelled by electricity, or on anything driven by electric motors, I connect the said sliding bar or bars by suitable means with the lever of a switch, which makes and breaks the main circuit between the motor and the generator. Either the switch-lever is provided with an oblong hole or the reversing-bar or some intermediate link can be made to have sufficient backlash or freedom of movement or lost motion, so that the contact on the switch is broken while the brushes of the motor are at rest. By moving the switch-handle still farther the brushes are reversed, and finally by putting the lever to the end of its course contact is made in the switch to allow the current to flow when the rotation of the armature is the opposite of what it was with the switch-lever in its original position. The return movement will of course bring the mechanism back to the first condition. The backlash of the mechanism and an intermediate spring or its equivalent determine the relative motion of the switch-handle and the brushes. In place of the devices above referred to I may use modified forms of apparatus, two of which are described hereinafter. The method of first removing the current from off the motor, either by breaking the circuit or inserting a high resistance and then shifting the brushes from and to the commutator in reversing an electric motor, is the same in all cases. It is possible to carry out the breaking of the current either by a separate switch or by an automatically-actuated switch, which latter is more preferable.

Figure 2:
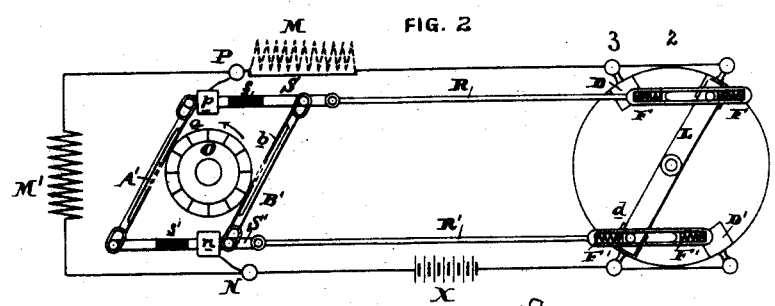
Figure 3:
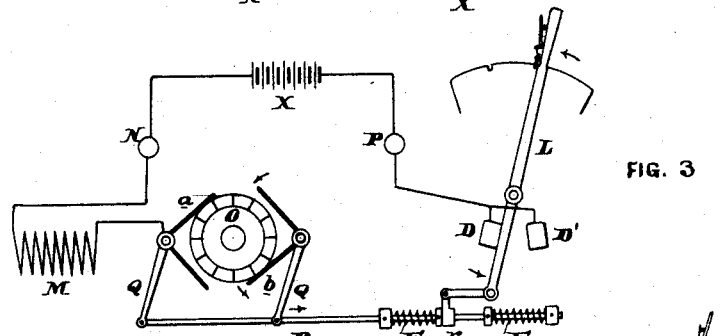
Figure 4:
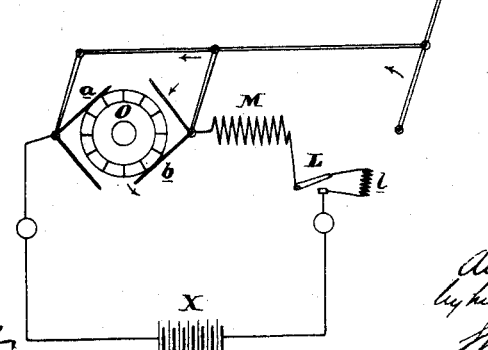

In the drawings, Figures 1 and 2 show views, in elevation, of one form of my improved mechanism with the apparatus in its two extreme positions—that is to say, for the motor running in both directions. Fig. 3 is an elevation showing a modified form of apparatus embodying the same invention; and Fig. 4 is a simpler form of same, where the switch to break the circuit must be operated by hand independently of the reversing-lever for the brushes. Fig. 1 shows the position of parts when the motor runs in one direction, and Fig. 2 the position of parts when the motor runs in the opposite direction, as indicated by the arrow in each case on the commutator O of a motor of any suitable or usual construction.

A' and B' are the brass or copper backings or holders for the brushes $a$ and $b$, which latter thus virtually or electrically are only one brush each, although cut in the middle lest the commutator O should work against the brushes, which, if the latter, as is usual, are made of copper wire or sheet-copper, would or might buckle or damage them. The brush-holders A' and B' are, by pins working in oblong slots, jointed to parallel bars S and S', capable of sliding to and fro in fixed metal guides $p$ and $n$ and made in parts, with insulating-pieces $s$ and $s'$ inserted between them. Continuation-rods R and R', with intermediate springs F F' to give the needed elasticity, are jointed to one end of the parallel bars S and S', respectively, and form means of connection with the lever L of a switch of ordinary construction, which makes and breaks the main circuit between the motor and the generator, there being sufficient lost motion or backlash by pins on the lever L working in oblong holes on the rods R and R', so that the contact on the switch is broken while the brushes $a$ and $b$ are at rest. The rods R and R' are insulated from the switch-lever L.

P and N are the terminals of the motor. The switch-disk C is fitted with contact pieces or blocks and binding-screws D D' and E E', and the current from the source X passes through them, a circuit being made when the switch-lever L is in either of the positions 1 or 3 for working the motor in one direction of revolution or the other, while in the intermediate position 2 and while the brushes are at rest the contact on the switch C is broken. The current of electricity will, in series machines using this device, pass around the field-magnet coils M, then enter at the binding-screw P, thence pass to the guide $p$, and through the rod S and brush $b$ to the commutator, and after passing through the armature the current passes to brush $a$, rod S', and to binding-post N. With shunt-machines the current will pass the same, except that it will not go through a field-coil first.

M' in Fig. 1 shows the field-coil in a shunt-wound motor.

The arrangement of switch-lever for making and breaking the main circuit between the motor and the generator before reversing may also be employed in combination with other reversing arrangements depending on the displacement of the brushes.

In Fig. 3 of the drawings is shown a series motor. In this case we have the brushes $a$ $b$ connected two and two and arranged to be shifted by arms Q Q and rod R, so as to remove one pair of brushes and apply the other pair to change the lead to reverse. The rod R is provided with two springs F F, between which is a loose block $r$, which is connected to the reversing-lever L, which is also the circuit-breaking device or switch. In this case D D are the contact-blocks in circuit with one pole of the battery or source of current X. M represents the field-coil, and O the armature. It will be seen that the shifting of the lever L will first break the circuit, then shift the brushes $a b$, and finally complete the circuit. The spring F allows for slight irregularities in movement and to regulate the pressure of the brushes on the commutator.

In the case of Fig. 4 we have the same apparatus as Fig. 3, except that a switch L is moved by hand to break the circuit before moving the brushes and then closed by hand again. In place of completely breaking the circuit, a high resistance $l$ may be inserted, if desired. It will be seen that when the switch-lever is moved to reverse the motor the main circuit between the motor and the generator is broken, and the defects which are liable to take place when the brushes are removed from the commutator while the current is flowing through are thereby obviated.

Having now described my invention, what I claim as new, and desire to secure by Letters Patent, is—

1. The method of reversing the direction of rotation of an electric motor, consisting in first positively breaking the current which flows through the armature, then when no current is passing removing the brushes from the commutator, then applying the brushes to the commutator in the position for reversing, and finally closing the circuit through the armature.

2. The method of reversing the direction of rotation of an electric motor, consisting in first positively breaking the current which flows through the armature, then when no current is passing removing one set of brushes from the commutator pointing with the direction of rotation, then applying another set of brushes to the commutator in the position for reversing and pointing in the opposite direction to the first pair of brushes, and finally closing the circuit through the armature and last pair of brushes.

3. The method of reversing the direction of rotation of an electric motor, consisting of arresting the flow of current through the armature and brushes, then when no current is passing shifting the brushes to the new position for reversing, and then causing the current to flow freely over the brushes and through the armature.

4. The method of reversing an electric motor, consisting in arresting the flow of the normal current through the brushes and armature without disturbing the connection of the field-magnets with respect to the armature, then shifting the brushes to reverse the motor, and finally supplying normal current to the motor.

5. The method of reversing an electric motor, consisting in arresting the normal flow of current through the armature and brushes, then reversing the current in the armature without reversing the current in the field, and finally supplying the normal current to the armature.

6. The method of reversing an electric motor, consisting in arresting the normal flow of current through the armature and brushes, then reversing the current in the armature without reversing the current in the field, and simultaneously, or thereabout, shifting the brushes to a new position on the commutator for reversing, and finally supplying the normal current to the armature.

In testimony of which invention I hereunto set my hand.

ANTHONY RECKENZAUN.

Witnesses:
E. M. BRECKENREED,
ERNEST HOWARD HUNTER.